US010749869B1

(12) United States Patent
Bryan et al.

(10) Patent No.: US 10,749,869 B1
(45) Date of Patent: Aug. 18, 2020

(54) AUTHENTICATION AUTHORIZATION AND ACCOUNTING (AAA) SYSTEM ROAMING MANAGEMENT

(71) Applicant: Sprint Communications Company L.P., Overland Park, KS (US)

(72) Inventors: William P. Bryan, Gardner, KS (US); Nathan D. Canady, Overland Park, KS (US); Maria G. Giron, Overland Park, KS (US); Anthony E. Johnson, Lee's Summit, MO (US); Phillip R. King, Herndon, VA (US); Erika J. Petzold, Olathe, KS (US); Aaron M. Phillips, Lee's Summit, MO (US); Bruce E. Ziegler, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 241 days.

(21) Appl. No.: 16/012,001

(22) Filed: Jun. 19, 2018

(51) Int. Cl.
*H04L 29/06* (2006.01)
*H04L 12/24* (2006.01)
*H04L 29/08* (2006.01)
*H04W 12/06* (2009.01)
*H04W 84/12* (2009.01)

(52) U.S. Cl.
CPC ...... *H04L 63/0892* (2013.01); *H04L 41/0893* (2013.01); *H04L 63/20* (2013.01); *H04L 67/10* (2013.01); *H04L 67/34* (2013.01); *H04W 12/06* (2013.01); *H04W 84/12* (2013.01)

(58) Field of Classification Search
CPC . H04L 63/0892; H04L 63/20; H04L 41/0893; H04L 67/10
See application file for complete search history.

(56) References Cited

U.S. PATENT DOCUMENTS

2014/0099945 A1\* 4/2014 Singh ............... H04W 48/18
455/432.1
2018/0049019 A1\* 2/2018 Haran ............... H04W 8/12

\* cited by examiner

*Primary Examiner* — Chau Le
*Assistant Examiner* — Vance M Little

(57) ABSTRACT

A system for changing roaming policy configuration on an authentication, authorization, accounting (AAA) system. The system comprises a processor, a non-transitory memory, and an AAA policy change application stored in the non-transitory memory. When executed by the processor, the AAA policy change application launches execution of a plurality of instances of the automation script, monitors a progress of the instances of the automation script, compares the progress of the instances of the automation script to a time remaining of a predefined maintenance time window, where the AAA policy change application is configured to halt an in-progress update of roaming policy configuration on the plurality of AAA nodes based on the comparison of the progress of the instances of the automation script being insufficient relative to the time remaining of the predefined maintenance time window, and copies roaming policy files updated by the automation script to AAA nodes.

20 Claims, 4 Drawing Sheets

AUTHENTICATION AUTHORIZATION AND ACCOUNTING (AAA) SYSTEM ROAMING MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication subscribers in the United States expect to be able to conduct cell phone calls whenever and wherever they are. Users expect to enjoy ubiquitous wireless coverage, provided there is not some extenuating circumstance such as being located in a remote rural area, being located in a coverage gap, or a short-term service outage. To satisfy this expectation without having to deploy a fully nation-wide wireless communication network, wireless communication service providers may establish inter-provider wireless roaming agreements. A first subscriber having a wireless communication service subscription with a first service provider may obtain wireless coverage in an area where the first service provider does not own wireless cell sites by receiving wireless coverage from a second service provider, roaming on the wireless network of the second service provider. Such roaming agreements are typically reciprocal, such that a second subscriber having a wireless communication service subscription with the second service provider may obtain wireless coverage in an area where the second service provider does not own wireless cell sites by receiving wireless coverage from the first service provider, roaming on the wireless network of the first service provider. These roaming agreements may be implemented by authentication authorization accounting (AAA) nodes in the wireless networks. The agreements may change from time to time, leading to revisions in the AAA nodes.

SUMMARY

In an embodiment, a method of changing roaming policy configuration on an authentication, authorization, accounting (AAA) system comprising a plurality of AAA nodes is disclosed. The method comprises analyzing a data store comprising entries identifying roaming agreement changes, based on the analyzing, determining roaming policy configuration changes, and generating an automation script to complete the roaming policy configuration changes to roaming policy files stored at the plurality of AAA nodes. The method further comprises copying roaming policy files from the AAA nodes by an AAA policy change application executing on a computer system, where the computer system is separate from the AAA nodes, launching execution of a plurality of instances of the automation script on the computer system by the AAA policy change application during a predefined maintenance time window, and monitoring a progress of the instances of the automation script by the AAA policy change application. The method further comprises comparing the progress of the instances of the automation script to a time remaining of the predefined maintenance time window, where the AAA policy change application is configured to halt an in-progress update of roaming policy configuration on the plurality of AAA nodes based on the comparison of the progress of the instances of the automation script being insufficient relative to the time remaining of the predefined maintenance time window and copying roaming policy files updated by execution of the instances of the automation script to the AAA nodes. In an embodiment, the method further comprises evaluating a sanity of the AAA nodes.

In another embodiment, a system for changing roaming policy configuration on an authentication, authorization, accounting (AAA) system comprising a plurality of AAA nodes is disclosed. The system comprises a processor, a non-transitory memory, and an AAA policy change application stored in the non-transitory memory. When executed by the processor, the AAA policy change application copies roaming policy files from the AAA nodes and launches execution of a plurality of instances of the automation script on the computer system during a predefined maintenance time window. The AAA policy change application also monitors a progress of the instances of the automation script, compares the progress of the instances of the automation script to a time remaining of the predefined maintenance time window, where the AAA policy change application is configured to halt an in-progress update of roaming policy configuration on the plurality of AAA nodes based on the comparison of the progress of the instances of the automation script being insufficient relative to the time remaining of the predefined maintenance time window, and copies roaming policy files updated by execution of the instances of the automation script to the AAA nodes.

In yet another embodiment, a method of changing roaming policy configuration on an authentication, authorization, accounting (AAA) system comprising a plurality of AAA nodes is disclosed. The method comprises determining a date and time of modification of each of a plurality of different roaming policy files on each of the plurality of AAA nodes by an AAA policy change application executing on a computer system, where the computer system is different from the AAA nodes, copying the different roaming policy files on each of the plurality of AAA nodes by the AAA policy change application to a memory associated with the computer system, and launching execution of a plurality of instances of an automation script on the computer system during a predefined maintenance time window by the AAA policy change application, where each instance of the automation script is configured to install roaming policy changes to the copied roaming policy files, and where each instance of the automation script configures roaming policy changes to copied files associated with one of the AAA nodes, whereby the roaming policy files are updated. The method also comprises determining a date and time of modification of each of the plurality of different roaming policy files on each of the plurality of AAA nodes after the instances of the automation script complete execution and, based on the date and time of modification of the roaming policy files on the AAA nodes being unchanged after the completion of execution of the instances of the automation script, copying the roaming policy files to the AAA nodes, whereby the roaming policies implemented by the AAA nodes is updated.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
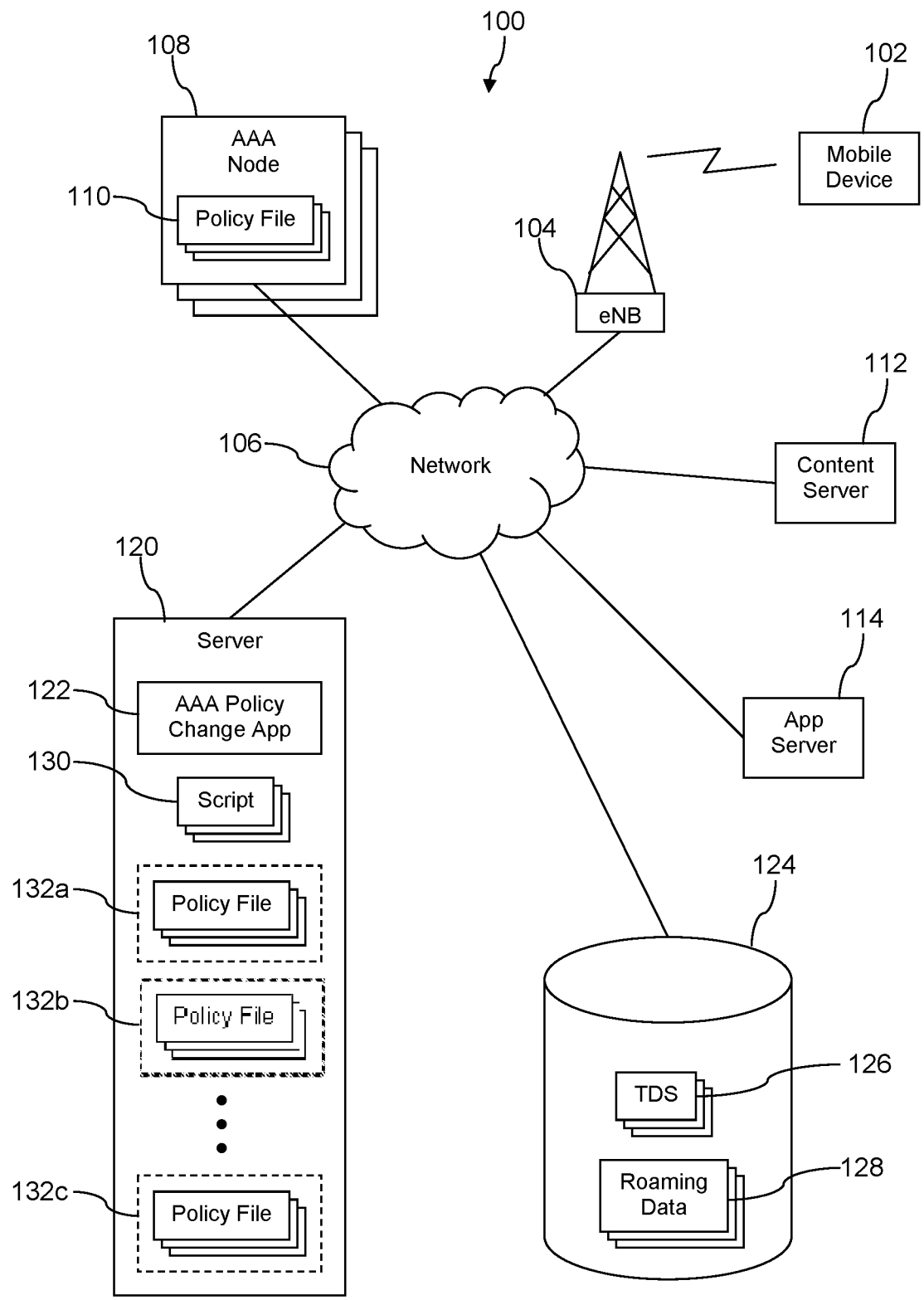
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method of automatically updating authentication, authorization, and accounting (AAA) configurations in a wireless communication service provider network is taught herein. Wireless communication service providers make changes to their wireless roaming configurations and share the updated roaming configurations or arrangements by promulgating technical data sheets (TDSs) to each other. For example, a first wireless communication service provider may change its roaming wireless communication arrangements for at least some of its subscribers. The first provider operates a first wireless communication network. The first provider creates a first TDS that defines its updated roaming arrangements and propagates this first TDS to a second wireless communication service provider and to a third wireless communication service provider. The second and third providers update their AAA configurations whereby to treat subscribers of the first provider attempting to roam onto a second wireless communication network operated by the second provider and onto a third wireless communication network operated by the third provider in accordance with the updated roaming agreements defined in the first TDS. In a similar manner, the second provider may change its roaming wireless communication arrangements, update a second TDS to define these changed roaming arrangements, and promulgate the second TDS to the first provider and to the third provider. Likewise, the third provider may change its roaming wireless communication arrangements, update a third TDS to define its changed roaming arrangements, and promulgate the third TDS to the first provider and to the second provider.

It happens that creating and updating the AAAs based on announcement TDSs has historically been a manual process that involved technicians or IT workers editing a plurality of files on each of a plurality of AAA nodes or hosts to update a wireless communication network in response to changes made to roaming arrangements of other providers. Additionally, this involved using multiple different computer tools and/or user interfaces, e.g., a "swivel chair" operating environment, that was inherently inefficient and error prone. The present disclosure teaches automating significant portions of the AAA update process.

Based on the TDS, scripts are generated to update two or more policy configuration files on the AAA—for example to update an access request policy configuration file and a billing request policy configuration file. The scripts may be created by an IT worker, but it is contemplated that the script may be generated by a script generation tool in the future. The script generation tool parses the TDS and automatically generates script instructions to revise a policy configuration file accordingly. In an embodiment, a different script is created to revise each different policy configuration file. In a different embodiment, a single script is created to revise a plurality of different policy configuration files.

The script can be executed on a server computer in the provider domain to revise a copy of the policy configuration file. A copy of the policy configuration file is first retrieved from the subject AAA by an AAA policy change application executing on a computer system in the provider domain. The AAA policy change application stores this copied AAA policy in a data store coupled to the computer system. The TDS is also stored in the data store. The AAA policy change application then launches one or more instances of the script to revise the policy configuration file based on instructions built into the script based on the TDS. Once revised, the AAA policy change application can write the policy configuration file to the subject AAA. In the event the AAA update process experiences trouble, the AAA policy change application or an IT worker can clean things up based on the unrevised roaming policy files stored in the data store.

The AAA policy change application may revise policy configuration files one AAA at a time, whereby to reduce the risk or degrading roaming services. Alternatively, in an embodiment, the AAA policy change application may revise policy configuration files on each of a plurality of AAAs concurrently.

Because the policy configuration files on the AAAs may be revised by others independently of the AAA policy change application, when the policy configuration files are copied, the time and date the file was last modified is recorded by the AAA policy change application. Before writing the revised policy configuration files back to an AAA, the AAA policy change application compares a current time and date of the policy configuration file on the AAA to the time and date of the file stored by the AAA policy change application when copying the policy configuration file down to the data store. If the time and date match, the policy configuration file has not been revised by another on the AAA after the AAA policy change application copied the file, and the AAA policy change application then copies the revised policy configuration file onto the AAA. If the time and date do not match, then there may be uncoordinated differences between the policy configuration file currently on the AAA and the revised policy configuration file stored in the computer system and/or the data store.

In an embodiment, the updating of AAAs is desirably completed during a pre-defined maintenance time window when roaming activity is assumed to be low, such as after midnight and before 6 AM. The maintenance time window may be about an hour long. The maintenance time window may be about 2 hours long. The AAA policy change application monitors the progress of the update of the AAAs and compares this progress to a remaining time in the maintenance time window. The AAA policy change application communicates with the AAAs through machine interfaces. As part of the activity of monitoring the progress, the AAA policy change application monitors errors on these machine interfaces. Errors on the machine interfaces may entail resending commands from the computer system to the AAA machine interface, and this can impact the assessment of progress. If the progress is lagging, the AAA policy change application may halt the AAA update process and back-out already completed updates. This may be done, for example, if the AAA policy change application deems the risk of not completing the entire AAA update before the end of the maintenance time window is above a predefined threshold.

The AAA policy change application monitors the AAAs after the completion of the AAA update to evaluate a sanity of the AAAs. The sanity evaluation is a high-level check of the basic stability and operation of the AAAs. The AAA policy change application monitors the rate of timeouts and compares this rate to a threshold rate of timeouts. If the observed rate of timeouts exceeds the threshold rate of timeouts, the AAA policy change application may deem the AAA update fault and may initiate cleanup activities. In an embodiment, the AAA policy change application evaluates a number of subscribers initiating roaming before evaluating the rate of timeouts (e.g., if there are no or few subscribers initiating roaming, there may not be a sufficiently large data set to evaluate AAA sanity).

Turning now to FIG. 1, a system 100 is described. In an embodiment, the system 100 comprises a mobile communication device 102, a cell site 104, a network 106, an authentication, authorization, and accounting (AAA) node 108. The mobile communication device 102 may be any of a mobile phone, a smart phone, a headset computer, a wearable computer, a laptop computer, a tablet computer, or a notebook computer. The cell site 104 is configured to provide a wireless communication link to the mobile communication device 102 according to one or more of a long term evolution (LTE), code division multiple access (CDMA), global system for mobile communication (GSM), or worldwide interoperability for microwave access (Wi-MAX) wireless communication protocol, linking the device 102 to the network 106. The network 106 comprises one or more public networks, one or more private networks, or a combination thereof.

The mobile communication device 102 may be subscribed to receive wireless communication service from a first wireless communication service provider using a first radio access network (RAN). The cell site 104 may be a part of a second RAN operated by a second wireless communication service provider. The mobile communication device 102 may receive a wireless link from the cell site 104 based on a roaming arrangement established between the first service provider and the second service provider. When the mobile communication device 102 requests the wireless link, the cell site 104 may request the AAA node 108 to authenticate and authorize access to the second RAN by the device 102 (e.g., to authorize the mobile communication device 102 to roam onto the second RAN). The AAA node 108 may evaluate the authorization request based on one or more policy files 110 stored in the AAA node 108 or in a data store coupled to the AAA node 108. In some context, the policy files 110 may be referred to as roaming policy files. If the mobile communication device 102 is authorized to roam onto the second RAN, the cell site 104 provides the wireless link to the mobile communication device 102 and connectivity into the network 106. In an embodiment, the mobile communication device 102 may request a data connection to conduct data communications such as email, Internet browsing, video streaming, or other data communication. For example, the mobile communication device 102 may stream video from a content server 112 or from an application server 114. The content server 112 and the application server 114 may be implemented as computer systems.

It is understood that the system 100 may comprise any number of mobile communication devices 102, any number of cell sites 104, and any number of AAA nodes 108. In an embodiment, the second wireless communication service provider (e.g., the roaming RAN in this example) may operate a plurality of AAA nodes 108. The plurality of AAA nodes 108 may provide redundancy and load sharing. The AAA nodes may be implemented as computer systems. Computer systems are described hereinafter.

The rights of the mobile communication device 102, subscribed for service with the first service provider, to roam in the second RAN operated by the second service provider may be defined by the first service provider in technical data sheets (TDSs) 126 that the first service provider promulgates to the second service provider and to other wireless communication service providers. The TDS 126 may define roaming arrangements for subscribers of the first service provider partitioned into different realms or categories of roaming service. Subscribers associated with a first realm, for example pre-paid subscriptions, may be granted no roaming service. Subscribers associated with a second realm may be granted roaming service where roaming fees are added to the subscribers' post-paid monthly bill. Subscribers associated with a third realm may be granted roaming service with no roaming fees added to the subscribers' monthly bill. When the mobile communication device 102 requests a wireless communication link from the cell site 104 (e.g., requests to roam into the second RAN), the device 102 sends a request message comprising an identification of the realm that it is associated with. When evaluating the roaming rights of the device 102, the AAA node 108 looks up rights of the device 102 based on the realm to which the device 102 is associated. As changes in the roaming arrangements of a service provider with its subscribers are made (e.g., as differences in service plans are deployed), the service provider generates and promulgates a revised TDS 126. The second service provider (and other wireless service providers) desirably updates the policy files 110 in its AAA nodes 108 in response to the revised TDS 126.

The system 100 further comprises a server 120 that executes an AAA policy change application 122. The server 120 comprises a plurality of scripts 130, each script 130 configured to revise a copy of one of the policy files 110. The scripts 130 may be generated by information technology (IT) workers based on the revised TDS 126 stored in a data store 124. Alternatively, the scripts 130 may be automatically generated by the AAA policy change application 122 based on the revised TDS 126.

When it executes, the AAA policy change application 122 restricts at least some of its activities to a predefined maintenance time window, for example a time window of from 1 AM to 3 AM, a time window from 2 AM to 3 AM, or some other time window. This predefined maintenance time window may be provided by an IT worker who launches the AAA policy change application 122 as an execution parameter or argument. Alternatively, the predefined maintenance time window may be defined by the AAA policy change application 122 or may be a system parameter of the server 120 defined by a root user or system administrator of the server 120. In an embodiment, the predefined maintenance time window is less than 2.25 hours. In an embodiment, the predefined maintenance time window is less than 1.25 hours.

The AAA policy change application 122 copies the policy files 110 from the AAA nodes 108. Each of the AAA nodes 108 may store a plurality of policy files 110. For example, each of the AAA nodes 108 may store an access request policy file, a billing request policy file, a Bell mobility request policy file, or other policy files. Because differences may exist between the same policy files 110 on different AAA nodes 108 (e.g., an access request policy file on a first AAA node 108 may be different from an access request policy file on a second AAA node 108), all of the policy files 110 from each of the AAA nodes 108 are copied by the AAA policy change application 122 to the data store 124. The AAA policy change application 122 notes a time and date of the most recent modification of each of the policy files 110 copied from the AAA nodes 108. The AAA policy change application 122 also copies these policy files 110 into a memory of the server 120 as policy files 132a associated with a first AAA node 108, policy files 132b associated with a second AAA node 108, and policy files 132c associated with a third AAA node 108.

The AAA policy change application 122 launches the scripts 130 to update the policy files 132a, 132b, 132c. The AAA policy change application 122 monitors both a progress of updating the policy files 132 as well as a remaining portion of the maintenance time window. When the revised policy files 132a, 132b, 132c are ready, the AAA policy change application 122 accesses the AAA nodes 108 and determines the current time and date the policy files 110 were last modified. If these time and dates match the time and dates the AAA policy change application 122 stored when copying the files down from the AAA nodes 108, the AAA policy change application 122 begins copying the revised policy files 132a back to the first AAA node 108, the revised policy files 132b back to the second AAA node 108, and the revised policy files 132c back to the third AAA node 108. If the time and dates do not match, the AAA policy change application 122 does not copy the revised policy files 132 back, and arbitration of policy file changes is conducted either by the AAA policy change application 122 or by an IT worker.

The AAA policy change application 122 uses machine interfaces added to the AAA node 108 to support automated copying of policy files 110 and writing to policy files 110 by the AAA policy change application 122. The machine interfaces may comprise a secure shell (SSH) or a secure socket shell interface. The machine interfaces may comprise a secure file transfer protocol (SFTP) interface.

The AAA policy change application 122 monitors the progress of the copying of the revised policy files 132 to the AAA nodes 108 versus the remaining portion of the maintenance time window. The AAA policy change application 122 further monitors errors that occur on the machine interface at the AAA nodes 108. If the AAA policy change application 122 deems the risk that the copying of the revised policy files 132 to each of the AAA nodes 108 will not complete before the end of the maintenance time window, the AAA policy change application 122 may stop the updating of policy files 110 and may restore the policy files 110 from the stored pre-revision policy files stored in the data store 124. In an embodiment, the AAA nodes 108 remain in service throughout the process or updating policy files by the AAA policy change application 122. In an embodiment, the AAA policy change application 122 generates an audit report that can be used by humans (e.g., IT workers, system administrators, managers) that captures the changes that were made to the AAA nodes 108 and/or to the policy files 110 and the current contents of the policy files 110. In an embodiment, the audit report is in a format that enhances readability.

After completing the updating of policy files 110 on the AAA nodes 108, the AAA policy change application 122 may determine a sanity of the AAA nodes 108 by monitoring various performance parameters of the AAA nodes 108. For example, the AAA policy change application 122 may monitor a rate of timeouts and compare timeout rates to a predefined timeout rate threshold. If the rate of timeouts exceeds the predefined timeout rate threshold, the AAA policy change application 122 may deem the policy files 110 on one or more AAA node as being faulty and take action. Alternatively, the AAA policy change application 122 may notify a responsible party or group about the policy files 110 deemed faulty, and they may take action.

In an embodiment, a two-step authorization process or two-step approval process may be built into the AAA policy change application 122, such that the two-steps in the authorization process or approval process are required to be completed before the AAA policy change application 122 begins policy file updates (e.g., before initiating copying policy files 110 from the AAA nodes 108). In an embodiment, at least two independent business groups may desirably review the plans and/or artifacts associated with updating the policy files 110 and provide their approval and sign-off. The authorization or the approval may be based on a review of a variety of artifacts, such as one or more of an abstract of the TDS 126 changes, a copy of the scripts 130, a quality control report on the scripts 130, a test plan for testing the scripts 130, test results of executing tests of the scripts 130, or a list of team members involved in creating the scripts 130.

Figure 2:
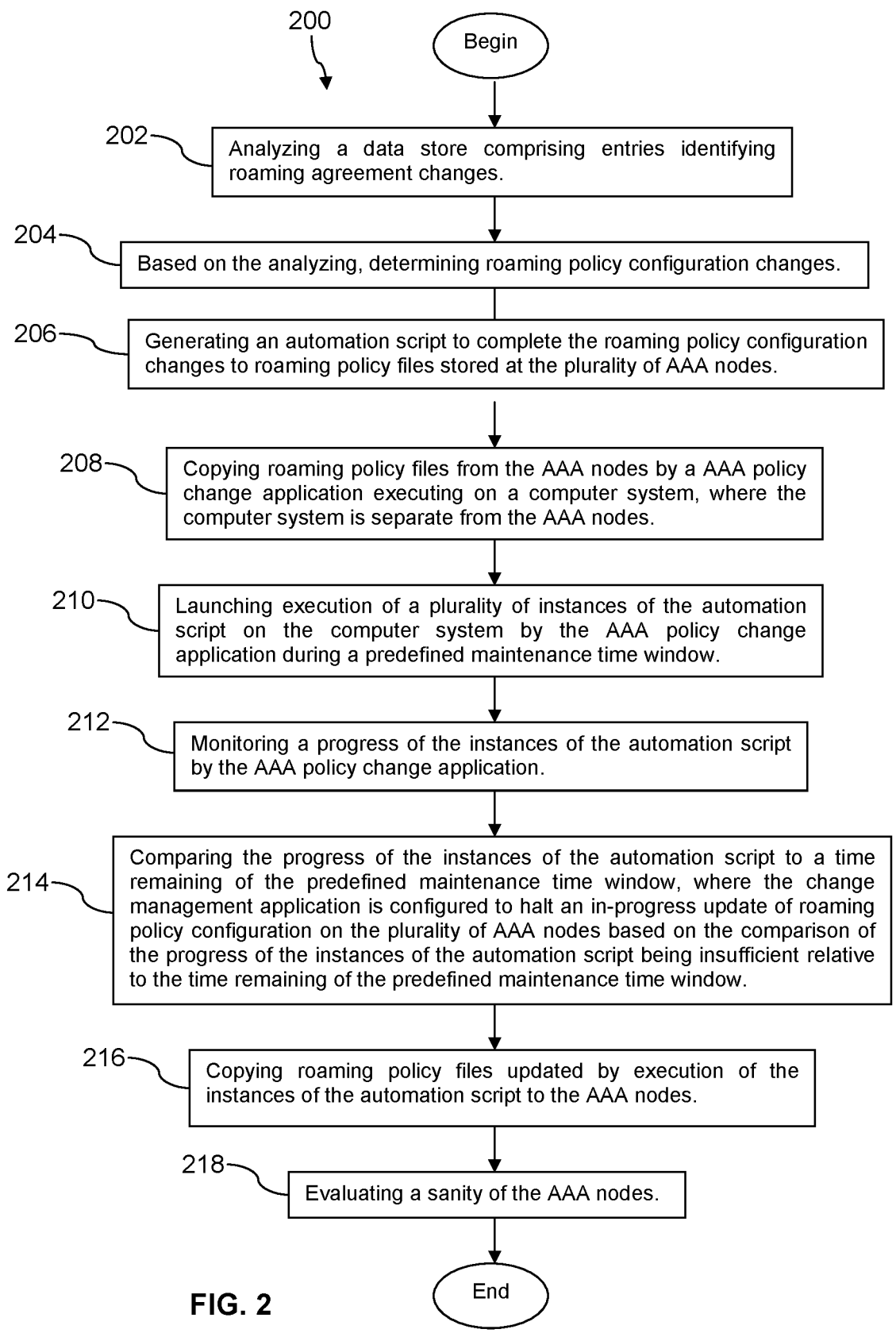
FIG. 2 is a flow chart of a method according to an embodiment of the disclosure.

Turning now to FIG. 2, a method 200 is described. At block 202, method 200 comprises analyzing a data store comprising entries identifying roaming agreement changes. In an embodiment, the entries identifying roaming agreement changes are contained in a technical data sheet (TDS). At block 204, method 200 comprises, based on the analyzing, determining roaming policy configuration changes. The policy configuration changes may affect a plurality of different policy files 110. The changes may affect one or more of an access request policy file, a billing request policy file, or a Bell mobility request policy file. At block 206, method 200 comprises generating an automation script to complete the roaming policy configuration changes to roaming policy files stored at the plurality of AAA nodes. Block 206 may comprise generating a plurality of automation scripts to complete the roaming policy configuration changes, for example a different automation script for each of a plurality of different policy files.

At block 208, method 200 comprises copying roaming policy files from the AAA nodes by an AAA policy change application executing on a computer system, where the computer system is separate from the AAA nodes. Before executing the processing of block 208, a two-step authorization process may be completed where two independent authorities (e.g., managers of different work groups) review the plans for changing roaming policy files as well as software artifacts to be used to execute the changes to the policy files. Before copying the policy files, the AAA policy change application may make a record of the time and date each policy file was last modified on the AAA node. The AAA policy change application may store copies of the policy files in a data store accessible to the AAA policy change application and remote from the AAA node. In an embodiment, the AAA policy change application stores the copies of the policy files in a memory of the computer system on which the AAA policy change application executes. At block 210, method 200 comprises launching execution of a plurality of instances of the automation script on the computer system by the AAA policy change application during a predefined maintenance time window. At block 212, method 200 comprises monitoring a progress of the instances of the automation script by the AAA policy change application.

At block 214, method 200 comprises comparing the progress of the instances of the automation script to a time remaining of the predefined maintenance time window, where the AAA policy change application is configured to halt an in-progress update of roaming policy configuration on the plurality of AAA nodes based on the comparison of the progress of the instances of the automation script being insufficient relative to the time remaining of the predefined maintenance time window. At block 216, method 200 comprises copying roaming policy files updated by execution of the instances of the automation script to the AAA nodes. The method 200 may further comprise generating an audit report and providing the audit report to operators such as IT workers, system administrators, and/or managers for review. At block 218, the method 200 may further comprise evaluating a sanity of the AAA nodes. If one or more AAA nodes are found to be insane (e.g., to fail the basic test of sanity), the AAA nodes may be restored to their previous state by backing out the changes (e.g., restoring the policy files 110 from the stored pre-revision policy files stored in the data store 124).

Figure 3:
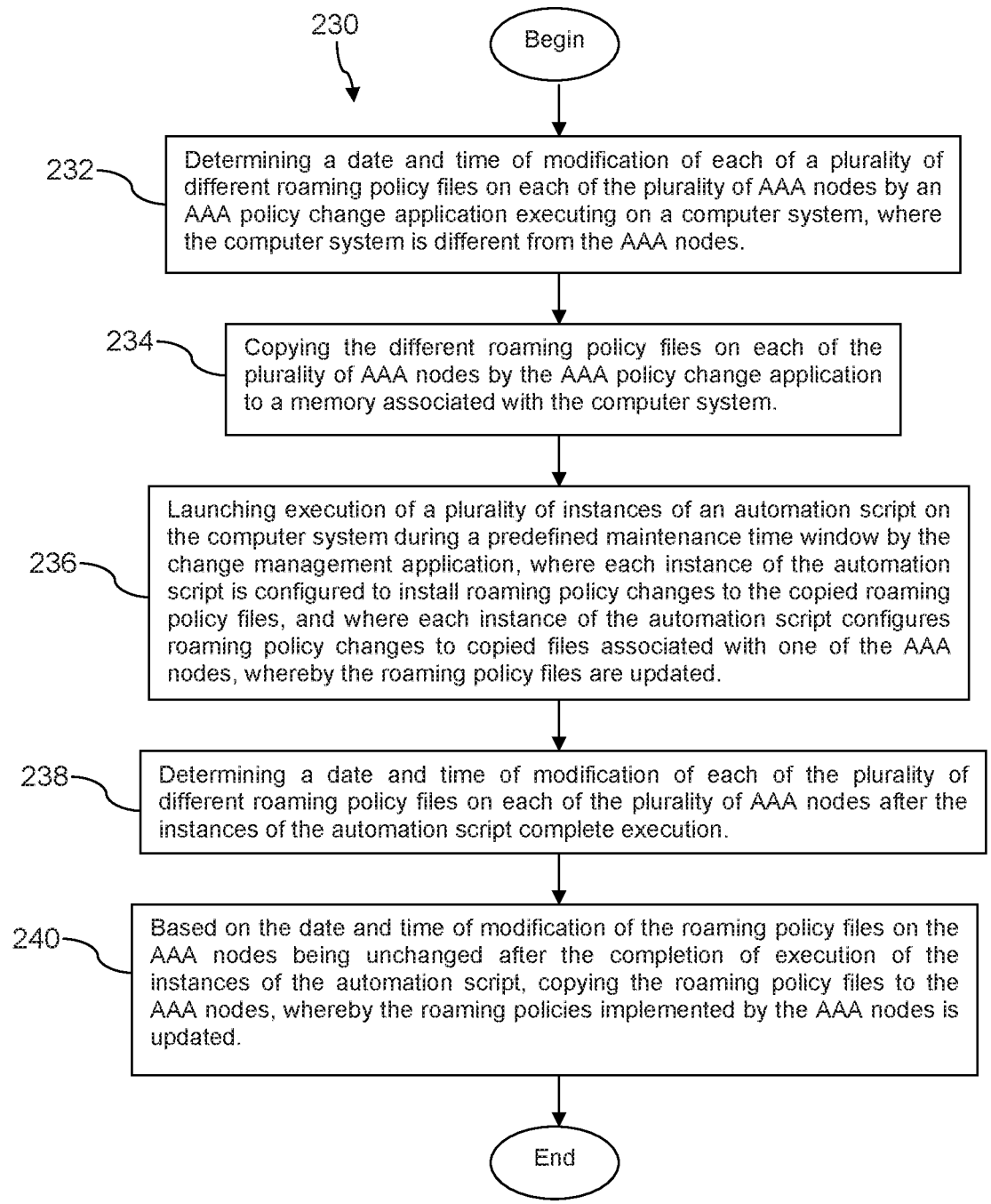
FIG. 3 is a flow chart of another method according to an embodiment of the disclosure.

Turning now to FIG. 3, a method 230 is described. At block 232, method 230 comprises determining a date and time of modification of each of a plurality of different roaming policy files on each of the plurality of AAA nodes by an AAA policy change application executing on a computer system, where the computer system is different from the AAA nodes. At block 234, method 230 comprises copying the different roaming policy files on each of the plurality of AAA nodes by the AAA policy change application to a memory associated with the computer system.

At block 236, method 230 comprises launching execution of a plurality of instances of an automation script on the computer system during a predefined maintenance time window by the AAA policy change application, where each instance of the automation script is configured to install roaming policy changes to the copied roaming policy files, and where each instance of the automation script configures roaming policy changes to copied files associated with one of the AAA nodes, whereby the roaming policy files are updated.

At block 238, method 230 comprises determining a date and time of modification of each of the plurality of different roaming policy files on each of the plurality of AAA nodes after the instances of the automation script complete execution. At block 240, method 230 comprises, based on the date and time of modification of the roaming policy files on the AAA nodes being unchanged after the completion of execution of the instances of the automation script, copying the roaming policy files to the AAA nodes, whereby the roaming policies implemented by the AAA nodes are updated.

Figure 4:
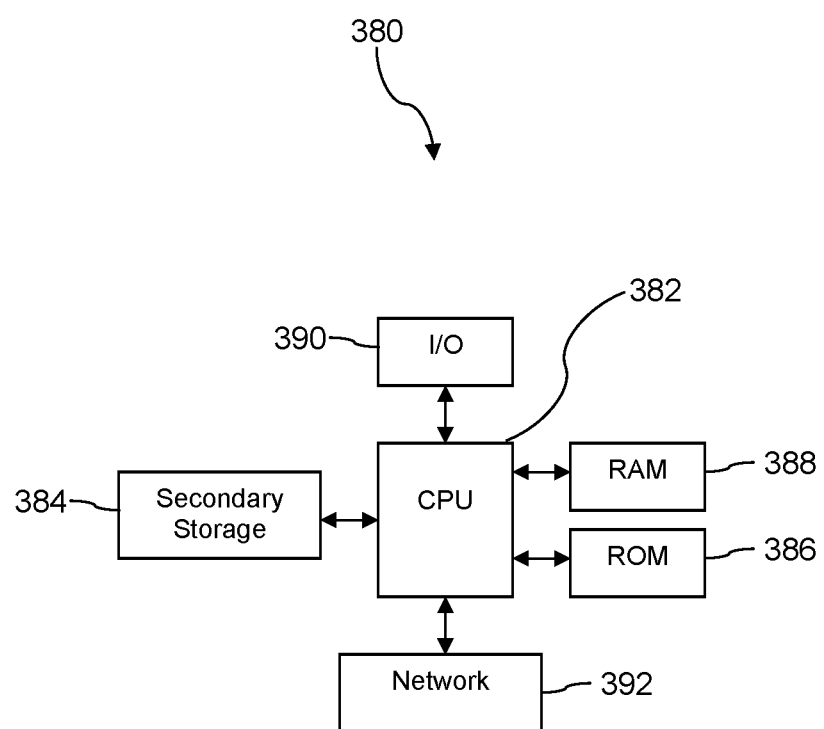
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of changing roaming policy configuration on an authentication, authorization, accounting (AAA) system comprising a plurality of AAA nodes, comprising:
   analyzing a data store comprising entries identifying roaming agreement changes;
   based on the analyzing, determining roaming policy configuration changes;
   generating an automation script to complete the roaming policy configuration changes to roaming policy files stored at the plurality of AAA nodes;
   copying roaming policy files from the AAA nodes by an AAA policy change application executing on a computer system, where the computer system is separate from the AAA nodes;
   launching execution of a plurality of instances of the automation script on the computer system by the AAA policy change application during a predefined maintenance time window;
   monitoring a progress of the instances of the automation script by the AAA policy change application;
   comparing the progress of the instances of the automation script to a time remaining of the predefined maintenance time window, where the AAA policy change application is configured to halt an in-progress update of roaming policy configuration on the plurality of AAA nodes based on the comparison of the progress of the instances of the automation script being insufficient relative to the time remaining of the predefined maintenance time window;
   copying roaming policy files updated by execution of the instances of the automation script to the AAA nodes in response to the comparing; and
   evaluating a sanity of the AAA nodes, wherein the sanity evaluation comprises a high-level check of basic stability and operation of the AAA nodes.

2. The method of claim 1, wherein evaluating the sanity of the AAA nodes comprises monitoring a rate of timeout events on each of the AAA nodes by the AAA policy change application.

3. The method of claim 1, further comprising monitoring errors on an automation interface of the AAA policy change application to the AAA nodes.

4. The method of claim 1, where the roaming policy files comprise roaming access request policy files.

5. The method of claim 4, where the roaming policy files comprise roaming billing request policy files.

6. The method of claim 5, where the roaming policy files comprise Bell mobility request policy files.

7. The method of claim 1, wherein analyzing the data store comprising entries identifying roaming agreement changes comprises analyzing technical data sheets (TDSs) stored in the data store.

8. A system for changing roaming policy configuration on an authentication, authorization, accounting (AAA) system comprising a plurality of AAA nodes, comprising:
   a processor;
   a non-transitory memory; and
   an AAA policy change application stored in the non-transitory memory that, when executed by the processor:
      analyzes a data store comprising entries identifying roaming agreement changes,
      copies roaming policy files from the AAA nodes,
      launches execution of a plurality of instances of an automation script during a predefined maintenance time window,
      monitors a progress of the instances of the automation script,
      compares the progress of the instances of the automation script to a time remaining of the predefined maintenance time window, where the AAA policy change application is configured to halt an in-progress update of roaming policy configuration on the plurality of AAA nodes based on the comparison of the progress of the instances of the automation script being insufficient relative to the time remaining of the predefined maintenance time window,
      copies roaming policy files updated by execution of the instances of the automation script to the AAA nodes in response to the comparison, and
      evaluates a sanity of the AAA nodes, wherein the sanity evaluation comprises a high-level check of basic stability and operation of the AAA nodes.

9. The system of claim 8, where the AAA policy change application generates the automation script based on the analyzing.

10. The system of claim 8, wherein the roaming policies define policies for supporting wireless roaming of mobile communication devices subscribed to receive wireless communication service from a first wireless communication service provider onto a radio access network (RAN) operated by a second wireless communication service provider.

11. The system of claim 8, where the roaming policy files comprise roaming access request policy files.

12. The system of claim 11, where the roaming policy files comprise roaming billing request policy files.

13. The system of claim 8, wherein the predefined maintenance time window is less than 2.25 hours.

14. The system of claim 8, wherein the predefined maintenance time window is less than 1.25 hours.

15. A method of changing roaming policy configuration on an authentication, authorization, accounting (AAA) system comprising a plurality of AAA nodes, comprising:

determining a date and time of modification of each of a plurality of different roaming policy files on each of the plurality of AAA nodes by an AAA policy change application executing on a computer system, where the computer system is different from the AAA nodes;

copying the different roaming policy files on each of the plurality of AAA nodes by the AAA policy change application to a memory associated with the computer system;

launching execution of a plurality of instances of an automation script on the computer system during a predefined maintenance time window by the AAA policy change application, where each instance of the automation script is configured to install roaming policy changes to the copied roaming policy files, and where each instance of the automation script configures roaming policy changes to copied files associated with one of the AAA nodes, whereby the roaming policy files are updated;

monitoring a progress of the instances of the automation script by the AAA policy change application;

comparing the progress of the instances of the automation script to a time remaining of the predefined maintenance time window, where the AAA policy change application is configured to halt an in-progress update of roaming policy configuration on the plurality of AAA nodes based on the comparison of the progress of the instances of the automation script being insufficient relative to the time remaining of the predefined maintenance time window;

determining a date and time of modification of each of the plurality of different roaming policy files on each of the plurality of AAA nodes after the instances of the automation script complete execution;

in response to the comparing and based on the date and time of modification of the roaming policy files on the AAA nodes being unchanged after the completion of execution of the instances of the automation script, copying the roaming policy files to the AAA nodes, whereby the roaming policies implemented by the AAA nodes is updated; and evaluating a sanity of the AAA nodes, wherein the sanity evaluation comprises a high-level check of basic stability and operation of the AAA nodes.

16. The method of claim 15, wherein the roaming policy files define policies for supporting wireless roaming of mobile communication devices subscribed to receive wireless communication service from a first wireless communication service provider onto a radio access network (RAN) operated by a second wireless communication service provider.

17. The method of claim 16, wherein the RAN operated by the second wireless communication service provider provides wireless communication links according to a long term evolution (LTE), a code division multiple access (CDMA), a global system for mobile communications (GSM), or a worldwide interoperability for microwave access (WiMAX) wireless communication protocol.

18. The method of claim 15, wherein the AAA policy change application verifies that a two-step authorization process has been completed before copying roaming policy files stored on the AAA nodes.

19. The method of claim 15, where the roaming policy files comprise roaming access request policy files.

20. The method of claim 15, where the roaming policy files comprise roaming billing request policy files.

* * * * *